(12) United States Patent
Nguyen et al.

(10) Patent No.: US 10,647,910 B1
(45) Date of Patent: May 12, 2020

(54) METHODS FOR ENHANCING EFFECTIVE PROPPED FRACTURE CONDUCTIVITY

(71) Applicant: HALLIBURTON ENERGY SERVICES, INC., Houston, TX (US)

(72) Inventors: Philip D. Nguyen, Houston, TX (US); Baidurja Ray, Jersey Village, TX (US); Vishwajit Manajirao Ghatge, Katraj (IN); Larry Steven Eoff, Porter, TX (US); Christopher Austin Lewis, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/165,362

(22) Filed: Oct. 19, 2018

(51) Int. Cl.
*C09K 8/80* (2006.01)
*E21B 43/267* (2006.01)

(52) U.S. Cl.
CPC .............. *C09K 8/80* (2013.01); *E21B 43/267* (2013.01)

(58) Field of Classification Search
CPC ................................ E21B 43/267; C09K 8/80
See application file for complete search history.

(56) References Cited

U.S. PATENT DOCUMENTS

| | | | |
|---|---|---|---|
| 5,531,274 A | 7/1996 | Bienvenu, Jr. | |
| 7,210,528 B1 | 5/2007 | Brannon et al. | |
| 7,472,751 B2 | 1/2009 | Brannon et al. | |
| 7,708,069 B2 | 5/2010 | Watters et al. | |
| 8,936,083 B2 | 1/2015 | Nguyen | |
| 8,960,284 B2 | 2/2015 | Nguyen et al. | |
| 2008/0032898 A1* | 2/2008 | Brannon ................... | C09K 8/62 507/100 |
| 2009/0107674 A1* | 4/2009 | Brannon ................... | C09K 8/62 166/280.2 |
| 2011/0180260 A1* | 7/2011 | Brannon ................... | C09K 8/62 166/281 |
| 2018/0030333 A1 | 2/2018 | Nguyen et al. | |
| 2018/0051203 A1 | 2/2018 | Nguyen et al. | |
| 2018/0066179 A1 | 3/2018 | Nguyen et al. | |

* cited by examiner

*Primary Examiner* — Crystal J Miller
(74) *Attorney, Agent, or Firm* — Haynes and Boone, LLP

(57) ABSTRACT

The present disclosure relates to oil and gas well proppant compositions and methods for enhancing the conductivity of a propped fracture formed during a hydraulic fracturing operation. The method introduces a micro-proppant slurry prepared with slickwater containing both a low-density and a conventional micro-proppant during injection of the pad fluid stages to prop the natural and induced microfractures open and then injecting a proppant slurry prepared with slickwater containing low-density proppant and conventional frac sand during proppant slurry stage to prop the dominant fractures or large branches, provide open flow paths to keep them connective with the wellbore.

20 Claims, 4 Drawing Sheets

METHODS FOR ENHANCING EFFECTIVE PROPPED FRACTURE CONDUCTIVITY

FIELD OF THE INVENTION

The present disclosure relates to oil and gas well proppant compositions and, more particularly, to methods for enhancing the conductivity of a propped fracture formed during a hydraulic fracturing operation.

BACKGROUND

Hydraulic fracturing is a stimulation technique used to increase the production of hydrocarbons from subterranean formations. During hydraulic fracturing, a fracturing fluid and/or pad fluid is pumped into a subterranean formation at a rate and pressure sufficient to break down or erode the formation thereby initiating and/or propagating one or more hydraulic fractures. While pad fluids generally do not contain particulates, fracturing fluids typically carry and deposit solids, such as proppant, into the fracture. When properly deposited, proppant acts as a physical barrier to prevent the propped portions of the fractures from closing. After the completion of a hydraulic fracturing treatment, properly propped fractures provide a pathway for hydrocarbons and/or other formation fluids to flow into the wellbore. Unpropped fractures, on the other hand, close back allowing little, if any, fluid flow. Accordingly, the hydrocarbon production potential of a hydraulically fractured well depends upon the transport properties of the fracturing fluid—more particularly, the ability of the fracturing fluid to transport and deposit proppant along the full length and height of the fracture—as well as the conductivity of the propped fracture.

While traditional hydraulic fracturing operations rely on relatively high viscosity fracturing fluids (e.g., aqueous gels, oil-based fluids, viscoelastic surfactant gels, and emulsions) to transport proppants, current fracturing operations often utilize low-viscosity fracturing fluids (e.g., slickwater) to enhance the generation of complex fracture networks in unconventional formations such as shale. Additionally, the use of such low-viscosity fluids can reduce operational costs and formation damage. Unfortunately, low-viscosity fracturing fluids typically exhibit poor transport properties compared to relatively high viscosity fracturing fluids. Specifically, conventional proppants and/or proppant mixtures (e.g., frac sand) tend to settle out of low-viscosity fluids.

Proppant settling reduces the effective length and height of a propped fracture as well as the final conductivity of the propped fracture. In addition, when proppant settles, it prematurely drops out of solution leaving less proppant in the fracturing fluid, resulting in unpropped or under-propped fractures and reducing the effective length of the propped fracture. By depositing proppant preferentially on the bottom side of the fracture, settling also leaves much of the fracture's height unpropped, effectively reducing the height of the propped fracture. Like wholly unpropped fractures, the unpropped portions of a propped fracture are susceptible to complete or partial close back. Thus, by reducing the effective length and height of a propped fracture, settling can significantly reduce the fracture's conductivity. Moreover, as the unpropped portions of the fracture close, the settled proppant may be crushed under the fractures' closing stresses, thereby further diminishing the fracture conductivity and flow potential of any fluid flowing through the propped fracture.

Thus, there is a continuing need for hydraulic fracturing methods utilizing low-viscosity fluids that provide improved and/or additional connective flow paths through propped fractures.

BRIEF DESCRIPTION OF THE DRAWINGS

The following figures are included to illustrate certain aspects of the present disclosure, and should not be viewed as an exclusive embodiment. The subject matter disclosed is capable of considerable modification, alteration, and equivalents in form and function, as will occur to those of ordinary skill in the art and having the benefit of this disclosure.

DETAILED DESCRIPTION

Figure 1:
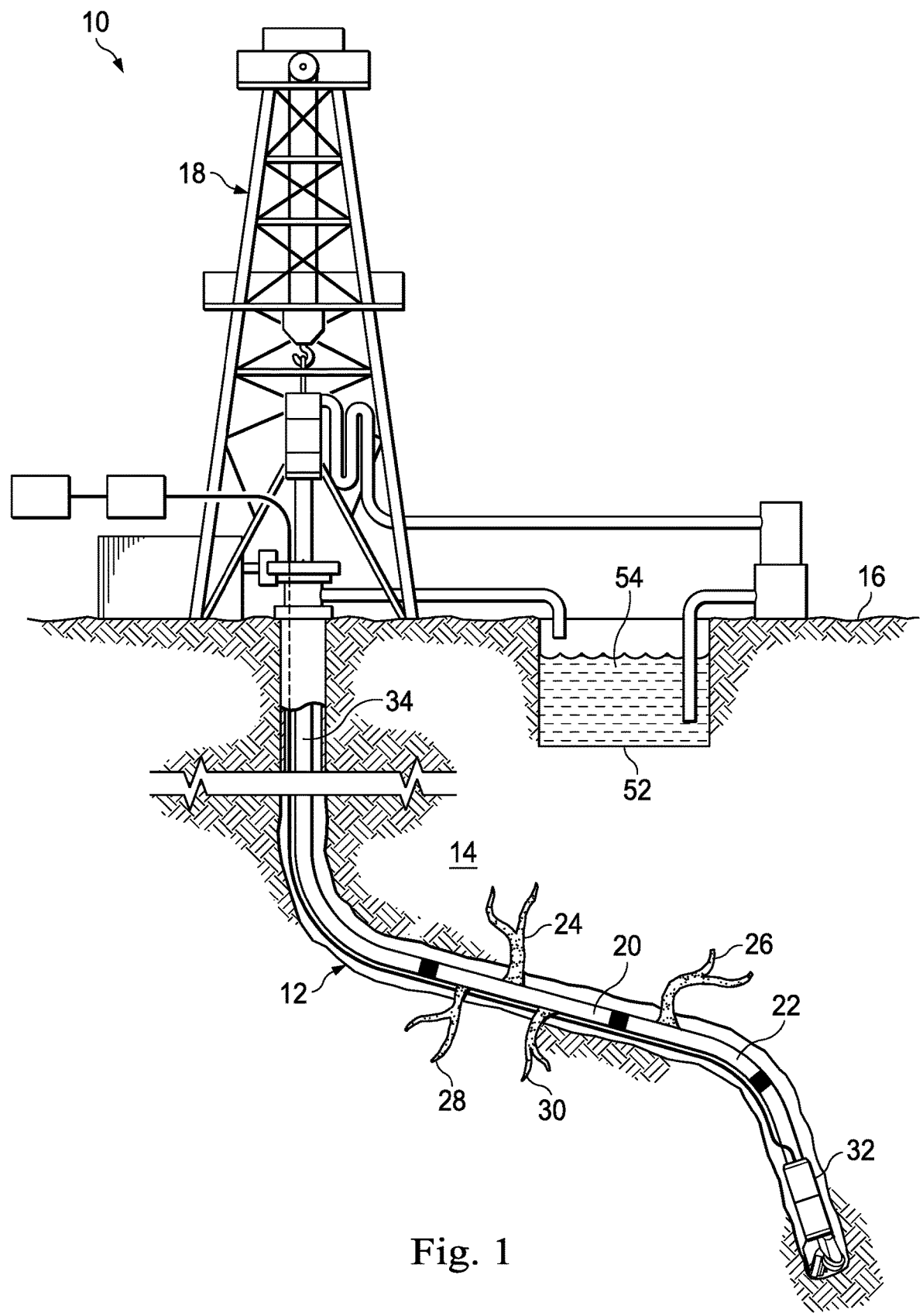
FIG. 1 illustrates a land-based drilling and production system.

In the following description, numerous specific details are set forth. However, it is understood that embodiments of the invention may be practiced without these specific details. In other instances, well-known structures and techniques have not been shown in detail in order not to obscure the understanding of this description.

Unless indicated otherwise, all measurements have metric units.

Unless indicated otherwise, the terms "a," "an," or "the" can refer to one or more than one of the noun they modify.

The term "interval" refers to a length of wellbore that can be closed off from a down-hole portion of the wellbore.

The term "density" refers to the measure of the amount of mass per volume of a particular substance. The term "specific gravity," as used herein in relation to proppant particles, is the weight per unit volume (grams per cubic centimeter) of the particles, including the internal porosity. The apparent specific gravity values given herein were determined by the Archimedes method of liquid (water) displacement according to API RP60, a method which is well known to those of ordinary skill in the art. For purposes of this disclosure, methods of testing the characteristics of the proppant in terms of apparent specific gravity are the standard API tests that are routinely performed on proppant samples.

The term "about" indicates a range which includes±5% when used to describe a single number. When applied to a range, the term "about" indicates that the range includes −5% of a numerical lower boundary and +5% of an upper numerical boundary. For example, a range of from about 100° C. to about 200° C. includes a range of from 95° C. to 210° C. However, when the term "about" modifies a percentage, then the term means±1% of the number or numerical boundaries, unless the lower boundary is 0%. Thus, a range of 5-10% includes 4-11%. A range of 0-5% includes 0-6%.

The term "conductivity," as used herein, is defined as the product of the width of the created fracture and the permeability of the proppant that remains in the fracture.

According to several embodiments, the effective length and height of a propped fracture can be enhanced without significant increases in operational costs by combining small amounts of low-density proppant with higher-density microproppant and/or other conventional proppants. First, low-density proppant has a hindered settling effect on higher-density proppant particulates (i.e., higher-density microproppant, frac sand, and other conventional proppants). Thus, a proppant slurry containing small amounts (e.g., less than 10 weight percent) of low-density proppant in combination with higher-density proppant enhances the effective propped fracture length by allowing the placement of higher-density and low-density proppant deeper in the fractures. Second, low-density proppant is buoyant in low-viscosity (e.g., water and other Newtonian fluids) fracturing fluids whereas higher-density proppant often is not, therefore low-density proppant is better able to form partial packs or pillars on the upper side of the fractures. Consequently, a proppant slurry containing small amounts of low-density proppant in combination with higher-density proppant will include pillars on the upper side of the fracture in addition to the pillars formed by the higher-density proppant on the bottom side of the fracture, thereby enhancing the effective propped fracture height.

Methods are provided for the hydraulic fracturing of subterranean formations using sequential proppant stages. According to several embodiments, the method includes isolating a first interval extending from a wellbore in a subterranean formation. According to several embodiments, a pad fluid stage is performed by injecting a first treatment fluid into the first zone of the subterranean formation at a pressure sufficient to create or extend at least a portion of a first fracture in the first interval. According to several embodiments, the pad fluid may be a low-viscosity fluid such as slickwater or a high-viscosity fluid including a gelled or cross-linked polymer such as xanthan or guar gum. According to several embodiments, a second treatment fluid is then injected into the first fracture. According to several embodiments, the second treatment fluid includes a micro-proppant slurry prepared with a first base fluid, such as slickwater or another low-viscosity fracturing fluid and a micro-proppant mixture. The term "slickwater" as used herein refers to a mixture of water and a friction reducer, selected from a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters, quaternized aminoalkyl acrylate, such as a copolymer of acrylamide and dimethylaminoethyl acrylate quaternized with benzyl chloride, and mixtures thereof. Slickwater may optionally include a clay control additive selected from a salt, a polymer, a resin, a soluble organic stabilizing compound, and any combination thereof and other chemicals as required but does not include gelling agents. According to several embodiments, the micro-proppant mixture includes a low-density micro-proppant and a higher-density micro-proppant. The injection of the second treatment fluid with the micro-proppant mixture will be referred to herein as the "micro-proppant stage". According to several embodiments, a third treatment fluid is then injected into the first fracture. According to several embodiments, the third treatment fluid includes a conventional proppant slurry prepared with a second base fluid, such as slickwater or another low-viscosity fracturing fluid and a conventional proppant mixture. According to several embodiments, the conventional proppant mixture includes a low-density conventional proppant and a higher-density conventional proppant. The injection of the third treatment fluid with the conventional proppant mixture will be referred to herein as the "conventional proppant stage". According to several embodiments, the methods include repeating the isolation of additional intervals extending from a wellbore in a subterranean formation followed by the sequential injection of the first, second and third treatment fluids described above.

As used herein, the term "low-density" in relation to micro-proppant and conventional proppant means a specific gravity in the range of from 0.8 to 1.3 g/cc.

As used herein, "higher-density" in relation to micro-proppant or conventional proppant generally refers to micro-proppant or conventional proppant having a specific gravity greater than the specific gravity of any low-density micro-proppant or conventional proppant included in the same composition. In addition, the term "higher-density" in relation to micro-proppant and conventional proppant means a specific gravity in the range of from 2.1 to 4.5 g/cc.

The term "micro-proppant" means proppant having particle sizes in the range of from 0.5 microns to 100 microns.

The term "conventional proppant" means proppant having particle sizes greater than 100 microns.

According to several embodiments, the concentrations of low-density micro-proppant or low-density conventional proppant in the micro-proppant slurry or the conventional proppant slurry is from about 1 to about 10 weight percent of the higher-density micro-proppant or the higher-density conventional proppant.

According to several embodiments, the concentration of higher-density micro-proppant in the slurry of micro-proppant is in the range of 0.01 lbm/gal to about 0.2 lbm/gal of the first base fluid.

According to several embodiments, the concentration of higher-density conventional proppant or frac sand in the slurry of conventional proppant is in the range of from about 0.2 lbm/gal to about 4 lbm/gal of the second base fluid.

According to several embodiments, the method includes isolating a first interval extending from a wellbore in a subterranean formation. According to several embodiments, a micro-proppant stage is injected concurrently with one or more pad fluid stages, followed by the injection of a conventional proppant stage.

According to several embodiments, the method includes isolating a first interval extending from a wellbore in a subterranean formation where the first interval includes at least one fracture and introducing a first treatment fluid into the first interval, wherein the first treatment fluid includes a first base fluid and a conventional micro-proppant that includes particles with particulate sizes of from about 0.5 microns to about 100 microns and having a specific gravity of from about 2.1 to about 4.5 grams per cubic centimeter. According to several embodiments, the method then includes introducing a first low-density micro-proppant into the first treatment fluid, wherein the low-density micro-proppant includes particles with particulate sizes of from about 0.5 microns to about 100 microns and having a specific gravity of from about 0.8 to about 1.3 grams per cubic centimeter. According to several embodiments, after introducing the first treatment fluid, the method then includes introducing a second treatment fluid into the first interval, wherein the second treatment fluid includes a second base fluid and a conventional proppant that includes proppant particles with particulate sizes greater than about 100 microns and having a specific gravity of from about 2.1 to about 4.5 grams per cubic centimeter. According to several embodiments, the method then includes introducing a first low-density proppant into the second treatment fluid, wherein the low-density proppant includes proppant particles with particulate sizes greater than about 100 microns and having a specific gravity of from about 0.8 to about 1.3 grams per cubic centimeter. According to several embodiments, the method then includes introducing a third treatment fluid into the first interval, wherein the third treatment fluid includes a third base fluid and a second low-density micro-proppant comprising particles with particulate sizes of from about 0.5 microns to about 100 microns and having a specific gravity of from about 0.8 to about 1.3 grams per cubic centimeter. According to several embodiments, the method then includes introducing a fourth treatment fluid into the first interval, the fourth treatment fluid including a fourth base fluid and a second low-density proppant that includes proppant particles with particulate sizes greater than about 100 microns and having a specific gravity of from about 0.8 to about 1.3 grams per cubic centimeter.

According to several embodiments, the micro-proppant stage includes a micro-proppant slurry prepared with slickwater or another low-viscosity fracturing fluid, having a viscosity of less than 5 centipoise (cP). According to several embodiments, the micro-proppant stage is operable to prop open the natural and induced micro-fractures and create connective flow paths between the micro-fractures and the dominant fractures and/or large branches of the wellbore. According to several embodiments, the conventional proppant stage includes a proppant slurry prepared with slickwater or another low-viscosity fracturing fluid, having a viscosity of less than 5 centipoise (cP). According to several embodiments, the conventional proppant stage is operable to prop the dominant fractures or large branches, providing open flow paths to keep them connective with the wellbore. Accordingly, the sequence of one or more micro-proppant stages followed by one or more conventional proppant stages creates improved conductive flow paths from the micro-fractures through the dominant fractures to the wellbore. Additionally, the sequence of one or more micro-proppant stages followed by one or more conventional proppant stages reduces the number of micro-fractures that close back after the pressure of the fracturing fluid is reduced, creating additional conductive flow paths from the micro-fractures to the wellbore.

Accordingly, hydraulic fracturing methods that include sequential proppant stages of a first micro-proppant slurry including a low-density micro-proppant and a higher-density micro-proppant followed by a conventional proppant slurry including a low-density conventional proppant and a higher-density conventional proppant enhances the effective length and height of the propped fracture and creates additional conductive flow paths increasing the overall production of the wellbore.

Turning to FIG. 1, shown is an elevation view in partial cross-section of a wellbore drilling and production system 10, utilized to produce hydrocarbons from wellbore 12 extending through various earth strata in an oil and gas formation 14 located below the earth's surface 16. Drilling and production system 10 may include a drilling rig or derrick 18 to perform various activities related to drilling or production, such as the methods described below. Likewise, drilling and production system 10 may include various types of tools or equipment 32 supported by rig 18 and disposed in wellbore 12 for performing these activities.

A working or service fluid source 52, such as a storage tank or vessel, may supply a working fluid 54 that is pumped to the upper end of tubing string 34 and flows through tubing string 34. Working fluid source 52 may supply any fluid utilized in wellbore operations, including without limitation, drilling fluid, slurry, acidizing fluid, liquid water, steam, hydraulic fracturing fluid, propane, nitrogen, carbon dioxide, natural gas, or any other type of fluid.

Wellbore 12 may be formed of a single or multiple bores extending into the formation 14, and disposed in any orientation, such as the horizontal wellbore 12 illustrated in FIG. 1. In several embodiments, wellbore 12 has at least one interval. In several embodiments, wellbore 12 has two or more intervals, for example, first interval 20 and second interval 22. According to several embodiments, each interval of wellbore 12 may include any number of fractures and/or fracture systems. Alternately, an interval may be free from fractures. For example, and as shown in FIGS. 1 and 2, first interval 20 includes fractures 24, 26, 28, and 30, whereas second interval 22 is not fractured.

Figure 2:
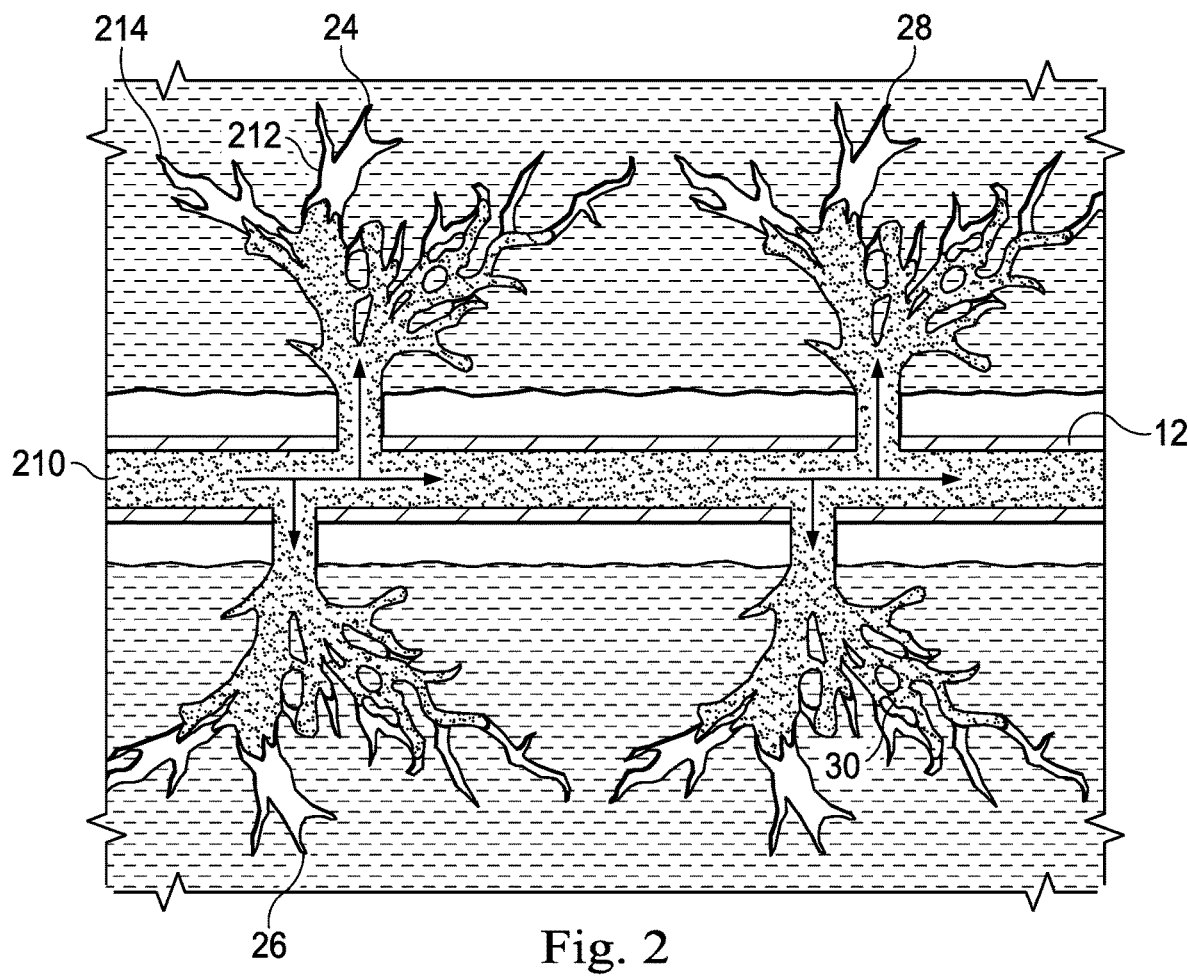
FIG. 2 shows an enlarged portion of an interval of the well depicted in FIG. 1.

FIG. 2 shows is an enlarged portion of interval 20 of FIG. 1. As in FIG. 1, interval 20 includes fractures 24, 26, 28, and 30. However, as shown in FIG. 2 according to several embodiments, fractures 24, 26, 28, and 30 form a fracture system which includes several interconnected fractures of varying size. In several embodiments, fractures 24, 26, 28, and 30 include one or more larger or dominant fractures such as dominant fracture 212. In several embodiments, fractures 24, 26, 28, and 30 also include one or more micro-fractures, such as micro-fracture 214. As used herein, the term "fracture" is not limited, and includes any single crack, fissure, or breach in the formation of any size, including but not limited to micro-fractures and dominant fractures. Likewise, the term "fracture" may also refer to an interconnected series of fractures or a fracture system. However, the term "micro-fracture" is limited to the extent that a micro-fracture is any single fracture with a width that is less than 100 microns.

With continued reference to FIGS. 1 and 2, wellbore 12 may be prepared by isolating interval 20 from interval 22 and any other points of entry located further downhole. Interval 20 is isolated by any suitable apparatus or method. In several embodiments, interval 20 is isolated by a bridge plug, a fracturing plug, or the like. In such an embodiment, the bridge or fracturing plug may be positioned within the wellbore 12 via a work string, a wireline, or any suitable conveyance. The bridge or fracturing plug may be set (e.g., actuated), for example, mechanically, hydraulically, or by the expansion of a swellable member.

In several embodiments, fluid 54 is introduced into interval 20. The term "introducing" is not limited, and includes any method of adding or placing a fluid into the wellbore or any method of adding or placing a fluid into interval 20. Suitable methods for introducing a fluid to the wellbore and/or interval 20 include injecting, pumping, pouring, and pulsing. As will be understood by those of ordinary skill in the art, pulsing involves intermittently adding or removing additives, chemicals or proppants into the flow stream.

In several embodiments, fluid 54 is introduced into interval 20 at a pressure sufficient to create or enhance at least one fracture (e.g., fracture 24) within interval 20. In several embodiments, the pressure sufficient to create or enhance at least one fracture and fracture face in the subterranean formation surrounding a wellbore interval varies depending on the properties of the subterranean formation, the depth of the interval, the designed fracture parameters, and the properties of the fracturing fluid. It is understood that the pressure can be the same or different for each interval to be subjected to hydraulic fracturing.

Fluid 54 may be a fracturing fluid, a stimulation fluid, a treatment fluid, or a base or a carrier fluid and a proppant composition. In several embodiments, fluid 54 is a traditional fracturing fluid. Often used in a gel-like state, traditional fracturing fluids generally consist of water and polymers, or other molecules that form a viscous liquid. Traditional fracturing fluids may also include oil-based fluids, viscoelastic gels, and emulsions as well as foam-based viscous and/or non-viscous fluids that use nitrogen bubbles or carbon dioxide to create or induce fractures.

In several embodiments, fluid 54 is a treatment fluid. In several embodiments, the treatment fluid includes a base fluid and a proppant composition. In several embodiments, the treatment fluid includes an aqueous fluid. In several embodiments, the base fluid is an aqueous fluid. The aqueous fluid can be fresh water, salt water (e.g., water containing one or more salts, such as potassium chloride, dissolved therein), brine (e.g., saturated salt water), or seawater. Examples of suitable salts include, but are not limited to, chloride, bromide, acetate, and formate salts of ammonium, alkyl ammonium, potassium, sodium, calcium, magnesium, and zinc. In several embodiments, the aqueous fluid, base fluid, and/or treatment fluid includes slickwater.

Slickwater is a non-viscous, low-density aqueous fluid that includes low concentrations of one or more chemical additives, most often a friction reducer. Hydraulic fracturing methods that include slickwater-based treatment fluids may include low proppant concentration, high fluid-efficiency, and high pump rates (often 60-120 bbl/minute), and are known to yield highly complex fracture systems. Moreover, unlike many conventional gelled fracturing fluids, the performance (friction reduction) of slickwater-based treatment fluids is generally less sensitive to the quality of the base aqueous fluid (i.e., the mix-water). In several embodiments, slickwater includes an aqueous fluid and a friction reducer. In several embodiments, slickwater includes an aqueous fluid and a friction reducer that includes a polyacrylamide derivative and/or copolymer. In several embodiments, slickwater includes an aqueous fluid, a friction reducer, and one or more chemical additives. In several embodiments, the chemical additives for slickwater include a biocide, a surfactant (for wettability modification), and a scale inhibitor.

As will be understood by those of ordinary skill in the art, a variety of conventional additives can be included in the treatment fluid and proppant composition, including bactericides, fluid loss additives, and the like, so long as the additives do not adversely react with the treatment fluids or prevent their use in a desired manner. However, as used herein, "treatment fluids" are low viscosity, low-density aqueous-based fluids rather than aqueous gels, oil-based fluids, viscoelastic gels, emulsions, and other viscous fluids traditionally thought of as suitable for use as a conventional fracturing fluid. Similarly, as used herein, "base fluids" are low viscosity, low-density aqueous fluids rather than aqueous gels, oil-based fluids, viscoelastic gels, emulsions, and other viscous fluids traditionally thought of as suitable for use as conventional fracturing fluids. As noted above, in several exemplary embodiments, a "low viscosity" fluid has a viscosity of less than about 5 centipoise (cP). Without being bound by theory, the use of a low viscosity fluid is thought to promote fracture complexity by increasing the created fracture surface area and by increasing the fracture density in the reservoir. Low viscosity fluids provide increased fracture network complexity and enhanced oil recovery. Accordingly, unlike the traditional hydraulic fracturing fluids described above, the treatment fluids, base fluids, proppant compositions, and proppant stages according to several embodiments are substantially free from gelling additives and gelling agents, including but not limited to galactomannan gelling agents, guar, hydroxyethylguar, hydroxypropylguar, carboxymethylguar, carboxymethylhydroxyethylguar, and carboxymethyl hydroxypropylguar.

The proppant composition includes any particles or particulates suitable for use in subterranean operations as proppant. Particulates suitable for use in subterranean operations as proppant include but are not limited to: sand, frac sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates include a binder and a filler material wherein suitable filler materials include silica, alumina, fumed carbon, carbon black, graphite, mica, titanium dioxide, metasilicate, calcium silicate, kaolin, talc, zirconia, boron, fly ash, hollow glass microspheres, solid glass, and combinations thereof.

As noted above, in several embodiments, the mean particle size of the proppant particulates is greater than 100 microns. In several embodiments, the mean particle size of the proppant particulates ranges from about 100 microns to about 420 microns. In several embodiments, the mean particle size of the proppant particulates generally ranges from greater than 140 mesh to about 40 mesh on the U.S. Sieve Series; however, in certain circumstances, other mean particle sizes may be suitable. In several embodiments, the mean particle size distribution ranges of the proppant particulates are one or more of 30/50, 30/70, 40/60, 40/70, or 50/70 mesh.

As noted above, in several embodiments, the proppant composition includes micro-proppant. Generally, micro-proppant can be made from any particles or particulates suitable for use in subterranean operations as proppant; micro-proppant is limited however, to proppant with particulate sizes from about 0.5 microns to about 100 microns.

According to several embodiments, a higher-density proppant is carried further (i.e. deeper) into a fracture(s) by injecting small amounts of a low-density proppant together with a higher-density proppant of the same or similar particulate size, thus enhancing the placement of the higher-density proppant. Without being bound by theory, it is believed that adding low-density proppant to the carrier fluid hinders the settling of the higher-density proppant allowing the higher-density proppant to be carrier deeper into the fractures before it falls out of solution. While settling may be counteracted by using a high pump rate or by increasing the viscosity of the carrier fluid, such methods often lose effectiveness once the fluid is placed into a fracture and before the fracture pressure is released. Accordingly, the addition of small amounts of a low-density proppant together with a higher-density proppant of the same or similar particulate size provides an effective means for deep proppant placement by increasing the ability of the higher-density proppant to remain suspended in the non-viscous carrier fluids.

According to several embodiments, the low-density proppant and/or micro-proppant includes micro-particles selected from fly ash, carbon powder, carbon black, glass bubbles, glass spheres and fiberglass combined with a binder to form a particulate. The binder used to form the micro-particles into particulates can be any of the consolidating agents listed above, such as non-aqueous tackifying agents, aqueous tackifying agents, emulsified tackifying agents, silyl-modified polyamide compounds, resins, crosslinkable aqueous polymer compositions, polymerizable organic monomer compositions, consolidating agent emulsions, zeta-potential modifying aggregating compositions, and binders. According to several embodiments, the low-density proppant and/or micro-proppant includes any of the traditional proppant particulate materials listed above, so long as the density is correctly selected.

In several embodiments, the low-density proppant and/or low-density micro-proppant include thermoplastic beads prepared from polystyrenedivinylbenzene (SVDB), polyamide imides, nylon 6, polyamide 66, acrylic, polyphenylene oxide, a blend of polyphenylene oxide and nylon 6/6, acrylonitrile butadiene styrene (ABS), ethylene vinyl alcohol, polycarbonate/PET polyester blend, polyethylene terephthalate (PET), unreinforced polycarbonate/polybutylene terephthalate (PC/PBT) blend, polyethylene terephthalate glycol-modified copolymer, polyetherimide polyphenylene ether, molded polyphenylene sulfide (PPS), polyvinylbenzene, acrylonitrile-butadiene-styrene copolymers, polyvinylchloride, fluoroplastics, polysulfide, polypropylene, styrene acrylonitrile, polystyrene, phenylene oxide, polystyrene divinylbenzene, polyfluorocarbons, polyetherketones, polyamide-imides, or any combination thereof.

While at least some embodiments described herein relate to methods of using proppants having two ranges of density (i.e., low-density proppants and higher-density proppant), this is not intended to be limiting. For example, additional proppants (e.g., super-high-density proppants or super-low-density proppants) also may be provided according to one or more embodiments. Similarly, while at least some embodiments described herein relate to methods of using proppants having two ranges of sizes (i.e., proppant and micro-proppant), this is not intended to be limiting. For example, the method may include the addition of micro-proppant (i.e., particulate sizes less than 1 micron), followed by the addition of an intermediate proppant (i.e., particulate sizes less than 50 microns but greater than 5 microns), and a traditional proppant (i.e., particulate sizes less than 1 mm but greater than 100 microns) may be provided according to one or more embodiments.

In several embodiments, the treatment fluid and the proppant composition are substantially free of proppant aggregates. As used herein, "aggregates" are agglomerations or clusters of smaller particles—most often proppant—that are formed and move as a single mass or collection within the wellbore and/or carrier fluid. As discussed in more detail below, aggregates may be formed by the addition of sufficient quantities of a consolidating agent. However, aggregates may also be formed by placing particles, such as proppant, into gel bodies, superabsorbent polymers, swellable polymers, or salts of polymeric material. Regardless of the method of formation, proppant aggregates can be formed before or after the proppant or proppant composition is introduced to the treatment fluid. For example, the proppant may be agglomerated and then introduced into the treatment fluid. As another example, the proppant or proppant composition may be added to the treatment fluid along with a sufficient quantity of a consolidating agent and the proppant particles may agglomerate into aggregates while the treatment fluid is moving throughout the wellbore.

Proppant aggregates are distinguishable from proppant aggregation, which occurs when a propped fracture or a portion thereof, closes onto proppant previously placed within the fracture. Unlike proppant aggregates which are free to move within the treatment fluid, the proppant particles coalesced by proppant aggregation are generally held in place by the closing forces of the fracture rather than a chemical added to the treatment fluid or proppant composition (e.g., a consolidating agent) or by placing the proppant in a viscous fluid (e.g., a gel body or polymer). Likewise, proppant packs—tightly packed permeable collections of proppant particles serving as a physical barrier that prevents the fracture from fully closing—are distinguishable from proppant aggregates because the proppant particles that form a proppant pack are coalesced by fracture forces rather than chemical means (e.g., adding a consolidating agent or placing the proppant in a viscous fluid).

In several embodiments, the proppant composition is substantially free of consolidating agents. In several embodiments, the treatment fluid is substantially free of consolidating agents. Consolidating agents are often added to wellbore treatment fluids that include proppant or other particles. When added in sufficient quantities, consolidating agents assist proppant and/or other particles to form aggregates. Examples of consolidating agents known to aid in the formation of proppant aggregates include, but are not limited to, non-aqueous tackifying agents, aqueous tackifying agents, emulsified tackifying agents, silyl-modified polyamide compounds, resins, crosslinkable aqueous polymer compositions, polymerizable organic monomer compositions, consolidating agent emulsions, zeta-potential modifying aggregating compositions, silicon-based resins, binders, and combinations and/or derivatives of the same.

Figure 3:
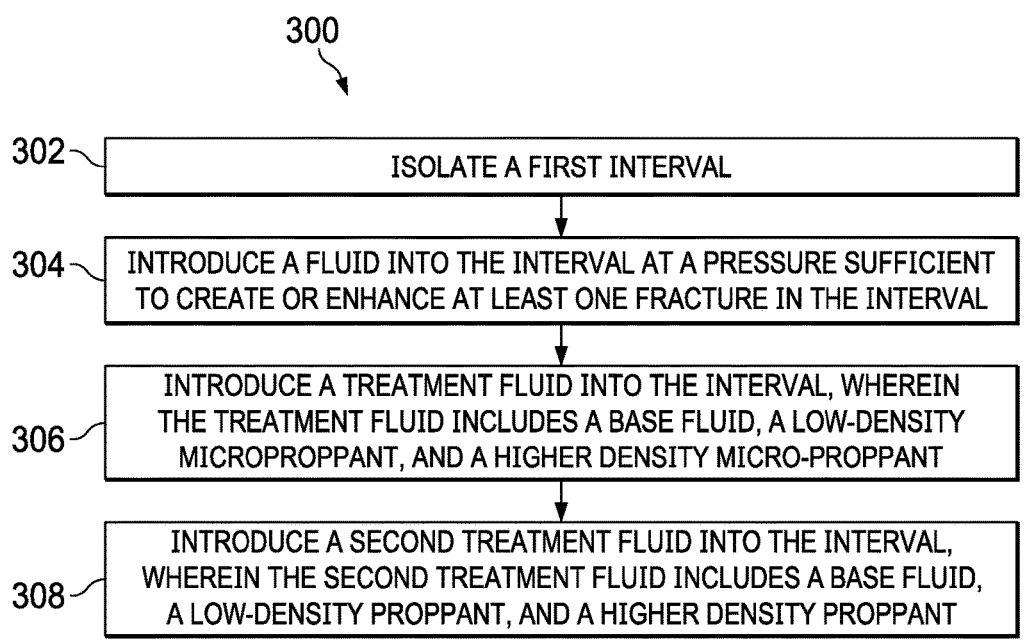
FIG. 3 depicts a method of fracturing a subterranean formation according to one or more embodiments of the present invention.

According to several exemplary embodiments, a method of treating a wellbore in a subterranean formation is provided. Turning now to FIG. 3, the method 300 includes isolating a first interval in step 302, introducing a fluid into the interval at a pressure sufficient to create or enhance at least one fracture in the interval in step 304; introducing a treatment fluid into the interval, wherein the treatment fluid includes a base fluid, a low-density micro-proppant, and a higher-density micro-proppant in step 306; and introducing a second treatment fluid into the interval, wherein the second treatment fluid includes a base fluid, a low-density proppant, and a higher-density proppant at step 308.

According to several exemplary embodiments, while different steps, processes, and procedures are described as appearing as distinct acts, one or more of the steps, one or more of the processes, and/or one or more of the procedures may also be performed, simultaneously and/or sequentially. In one or more embodiments, the steps, processes and/or procedures may be merged into one or more steps, processes and/or procedures. In one or more embodiments, one or more of the operational steps in each embodiment may be omitted. For example, in one or more embodiments, step 304 may be combined with step 306. In such an embodiment, the treatment fluid described in step 306 will be introduced at a pressure sufficient to create or enhance at least one fracture in the interval and will also include a base fluid, a low-density micro-proppant, and a higher-density micro-proppant. However, generally the steps of method 300 will be performed in the order described above. For example, generally, the treatment fluid of step 308 will not be introduced before the treatment fluid of step 306. In some instances, some features of the present disclosure may be employed without a corresponding use of the other features. Moreover, one or more of the above-described embodiments and/or variations may be combined in whole or in part with any one or more of the other above-described embodiments and/or variations with the exception described above.

Multiphase Simulations using the Eulerian Granular Model

To demonstrate the improved flow of the proppant-laden fluid, and specifically the increased transport of the proppant and related increase of the effective propped length of a fracture, the following simulations were modeled using Fluent Multiphase Simulations.

Simulations 1 and 2: The Eulerian Granular model was used to simulate the flow dynamics of two fluid mixtures of water and proppant, a standard solution and an exemplary embodiment. The standard solution included a fluid mixture with a primary phase of water and a secondary phase of fracturing sand ("frac sand"). The exemplary embodiment included a fluid mixture with a primary phase of water and a secondary phase of fracturing sand with 4 wt. % of FracBlack HT proppant. FracBlack HT is an ultra-light weight proppant commercially available from Sun of Belle Chasse, La. FracBlack HT is available in mesh size 14/40 and 30/80 and has a density of 1.054 g/cc. Accordingly, FracBlack HT is a low-density proppant. The physical model used is a slot channel with a length of 200 mm, a height of 20 mm and a width of 4 mm. Each simulation was allowed to run for approximately 30 seconds. Table 1, below, correlates the simulation time in seconds to the area of the slot channel covered by the secondary phase (i.e., proppant, most likely frac sand), in square meters ($m^2$). In order to cover the slot channel with the secondary phase, the proppant and/or proppant composition must fall out of solution or settle. Accordingly, the results of Simulations 1 and 2 presented in Table 1 demonstrate that the addition of the low-density proppant, FracBlack HT, hinders the settling of the frac sand, thereby increasing the amount of time the frac sand remains in solution.

TABLE 1

A Comparison of Simulation Time to Area Covered by Phase 2 for Simulations 1 and 2 (4 mm slot width).

| Standard Solution | | Exemplary Embodiment | |
|---|---|---|---|
| Time (sec.) | Area ($m^2$) | Time (sec.) | Area ($m^2$) |
| 0.9476 | 0.00003488 | 0.99562 | 0.00003862 |
| 4.9476 | 0.00136685 | 4.9956 | 0.00138099 |
| 9.9476 | 0.00245242 | 9.9956 | 0.00244652 |
| 14.948 | 0.00372624 | 14.996 | 0.00370583 |
| 19.948 | 0.00481950 | 19.972 | 0.00479225 |
| 24.948 | 0.00549619 | 25.034 | 0.00530939 |
| 29.948 | 0.00577644 | 30.065 | 0.00567448 |

Simulations 3 and 4: Once again, the Eulerian Granular model was used to simulate the flow dynamics of the standard solution and the exemplary embodiment described above in reference to Simulations 1 and 2. However, in Simulations 3 and 4, the physical model used is a slot channel with a length of 200 mm, a height of 20 mm and a width of 1 mm. Each simulation was allowed to run for approximately 10 seconds. As with the results of Simulations 1 and 2 shown in Table 1, above, the results of Simulations 3 and 4 presented in Table 2, below, demonstrate that the addition of FracBlack HT, hinders the settling of the frac sand, thereby increasing the amount of time the frac sand remains in solution.

TABLE 2

A Comparison of Simulation Time to Area Covered by Phase 2 for Simulations 3 and 4 (1 mm slot width).

| Standard Solution | | Exemplary Embodiment | |
|---|---|---|---|
| Time (sec.) | Area (m2) | Time (sec.) | Area (m2) |
| 0.9596 | 0.00005 | 0.9617 | 0.00004 |
| 2.0827 | 0.00011 | 2.0848 | 0.00011 |
| 3.0454 | 0.00016 | 3.0474 | 0.00016 |
| 4.008 | 0.00022 | 4.01 | 0.00021 |
| 4.9706 | 0.00027 | 4.9727 | 0.00027 |
| 5.9333 | 0.00034 | 5.9353 | 0.00033 |
| 7.0564 | 0.00040 | 7.0584 | 0.00039 |
| 8.019 | 0.00046 | 8.0211 | 0.00045 |
| 8.9817 | 0.00052 | 8.9896 | 0.00050 |
| 9.9443 | 0.00057 | 10.0023 | 0.00054 |

Slot Flow Tests

To demonstrate the improved flow of the proppant-laden fluid, and specifically, the increased transport of the proppant and related increase to the effective propped length of a fracture the following testing was performed using a glass slot with inner flow path dimensions of 30 mm height, 3 mm width and 300 mm length to model the fluid dynamics of the proppant-laden slickwater based treatment fluids in a fracture.

Slickwater was formed by mixing a friction reducer (FR) with water at a concentration of 1 mL of FR to 1000 mL of water. Standard solution 2 was made by combining 400 mL of slickwater with 48 grams of 30/50 mesh US Silica White Fracturing Sand. Exemplary Embodiment 2 was made by combining 400 mL of slickwater with 45.6 grams of 30/50 mesh US Silica White Fracturing Sand and 2.4 grams of 30/80 mesh light-weight proppant (LWP). The slot flow test was performed immediately after mixing the slickwater and adding the sand.

Approximately 150 mL of standard solution 2 was pumped at a rate of 120 mL/min through the slot, with the dimensions given above, for approximately 1 minute and 15 seconds. In these tests, a syringe pump was used to pull the slickwater/sand slurry through the slot. The sand that was carried through the slot to the syringe was collected, dried and weighed. The testing was completed three times, and on average, 2.47 grams of frac sand was carried out of the slot by standard solution 2. Next, approximately 150 mL of exemplary embodiment 2 was pumped at a rate of 120 mL/min through the slot for approximately 1 minute and 15 seconds. This test utilized the same slot as in the previous test. Following the first test the slot was rinsed with water until no sand was left in the slot. Once again, the frac sand was collected and measured. The testing was completed three times, and on average, 3.14 grams of frac sand was carried out of the slot by exemplary embodiment 2. These results demonstrate that the exemplary fluid exhibits better proppant transport properties than the standard solution, and consequently that the effective propped length of a fracture treated with the exemplary fluid will be greater than the effective propped length of the same fracture if treated with a standard proppant solution.

Figure 4A:
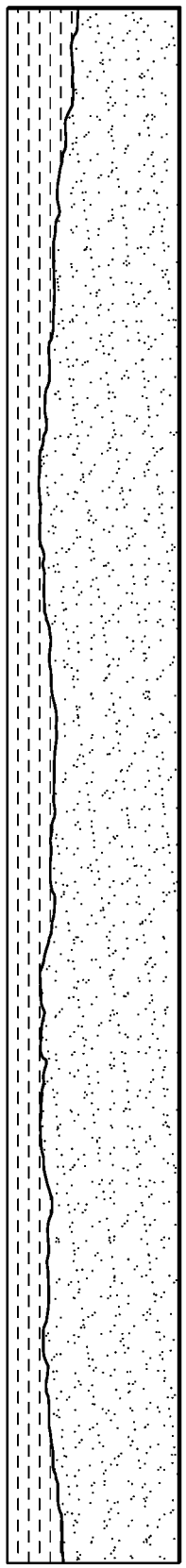
FIG. 4A depicts the results of slot flow tests.
Figure 4B:
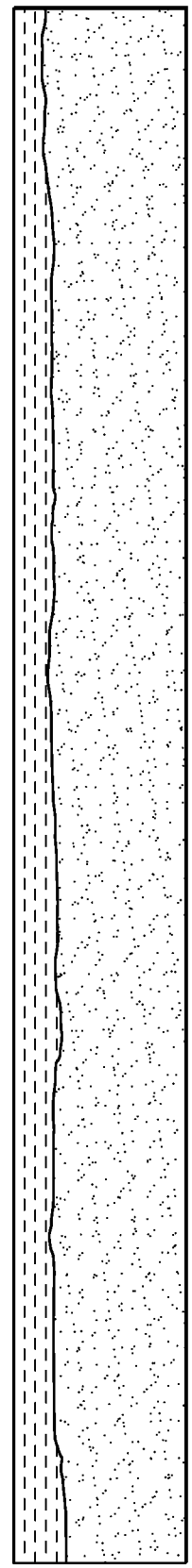
FIG. 4B depicts the results of slot flow tests.

FIGS. 4A and 4B are pictures of the slot following the slot flow tests, FIG. 4A shows the slot after treatment with exemplary embodiment 2 and FIG. 4B shows the slot after treatment with standard solution 2. The grey material at the bottom of both pictures is the proppant that has dropped out of solution during the slot flow tests and therefore remains visible at the bottom of the slot. It is worthwhile to note that LWP, the low-density proppant, is distributed throughout the frac sand, as seen by the black dots scattered throughout the grey region (settled frac sand bed). As seen by comparing FIG. 4A to FIG. 4B, the total area of the grey/black region in FIG. 4A is visibly less than the area of total grey region in FIG. 4B, demonstrating that less proppant has dropped out of the exemplary fluid than the standard fluid. This is especially apparent toward the end of the slot (the right side FIGS. 4A and 4B).

Although less obvious, FIG. 4A also demonstrates that the addition of the low-density proppant has increased the effective propped height of the fracture. Specifically, FIG. 4A shows a small population of low-density proppant at the top of the slot. This is consistent with the theory that low-density proppant is able to form partial packs or pillars on the upper side of the fractures.

Figure 5:
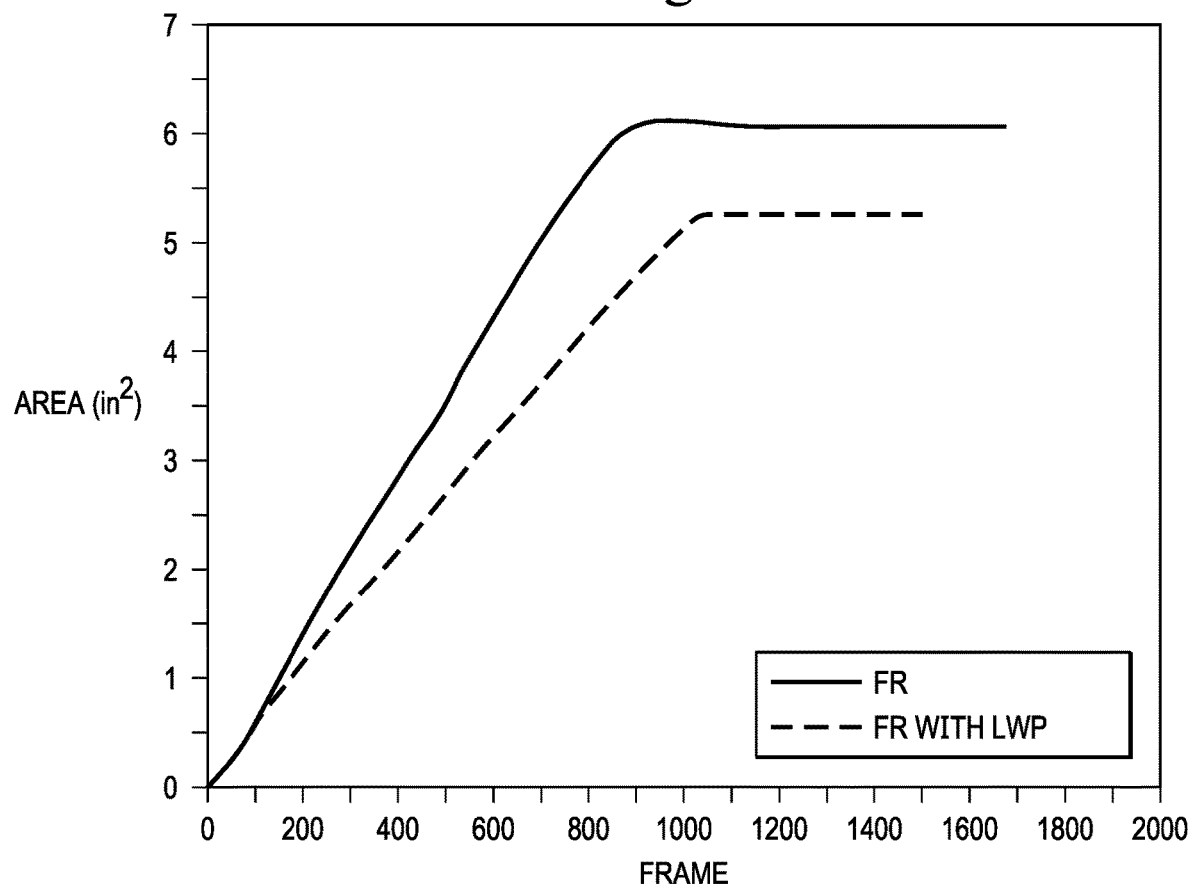
FIG. 5 is a graphical representation of the area of settled sand versus frames in a slot flow test.

FIG. 5 is a scatter plot of the area of settled proppant (y-axis) by frame (x-axis) for standard solution 2 and exemplary embodiment 2. As seen in FIG. 5, the settled area is less for the exemplary fluid than with the standard solution. These results are consistent with the pictures shown in FIG. 4A and FIG. 4B as well as with the measured results—as expected, if more proppant is carried out of the slot, then less proppant will drop out of the treatment fluid and remain in the slot, thus the measured area of settled proppant will be less. As discussed above, all the presented results demonstrate that the effective propped length of a fracture treated with the exemplary fluid will be greater than the effective propped length of the same fracture if treated with a standard proppant solution.

While the present invention has been described in terms of certain embodiments, those of ordinary skill in the art will recognize that the invention can be practiced with modification within the spirit and scope of the appended claims.

Any spatial references such as, for example, "upper," "lower," "above," "below," "between," "bottom," "vertical," "horizontal," "angular," "upwards," "downwards," "side-to-side," "left-to-right," "left," "right," "right-to-left," "top-to-bottom," "bottom-to-top," "top," "bottom," "bottom-up," "top-down," etc., are for the purpose of illustration only and do not limit the specific orientation or location of the structure described above.

While the present invention has been described in terms of certain embodiments, those of ordinary skill in the art will recognize that the invention can be practiced with modification within the spirit and scope of the appended claims.

The present disclosure has been described relative to certain embodiments.

Improvements or modifications that become apparent to those of ordinary skill in the art only after reading this disclosure are deemed within the spirit and scope of the application. It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method of treating a wellbore, comprising:
   isolating a first interval extending from a wellbore in a subterranean formation;
   introducing a first fluid into the first interval at a first pressure sufficient to create or enhance at least one fracture in the first interval;
   after introducing the first fluid, introducing a second treatment fluid into the fracture, the second treatment fluid comprising a first base fluid and a first proppant composition, the first proppant composition comprising:
      a low-density micro-proppant consisting essentially of proppant particles with particulate sizes of from about 0.5 microns to about 100 microns, the low-density micro-proppant having a specific gravity of from about 0.8 to about 1.3 grams per cubic centimeter; and
      a conventional micro-proppant consisting essentially of proppant particles with particulate sizes of from about 0.5 microns to about 100 microns, the conventional micro-proppant having a specific gravity of from about 2.1 to about 4.5 grams per cubic centimeter; and
   after introducing the first fluid and the second treatment fluid, introducing a third treatment fluid into the fracture, the third treatment fluid comprising a second base fluid and a second proppant composition, the second proppant composition comprising:
      a low-density proppant consisting essentially of proppant particles with particulate sizes of from about 100 microns to about 2 millimeters, the low-density proppant having a specific gravity of from about 0.8 to about 1.3 grams per cubic centimeter; and
      a conventional proppant consisting essentially of proppant particles with particulate sizes of from about 100 microns to about 2 millimeters, the conventional proppant having a specific gravity of from about 2.1 to about 4.5 grams per cubic centimeter.

2. The method of claim 1, where the first fluid is selected from a hydraulic fracturing fluid and a non-viscous aqueous treatment fluid.

3. The method of claim 2, wherein the first fluid is a treatment fluid and the first fluid, the first base fluid and the second base fluid include slickwater.

4. The method of claim 1, wherein the conventional proppant is frac sand.

5. The method of claim 1, wherein the low-density micro-proppant is present in the first proppant composition in an amount of from about 1% to about 10% by weight of the conventional micro-proppant.

6. The method of claim 1, wherein the conventional micro-proppant is present in the first proppant composition in an amount of from about 0.01 pound mass per gallon (lbm/gal) of the first base fluid to about 0.2 lbm/gal of the first base fluid.

7. The method of claim 1, wherein the low-density proppant is present in the second proppant composition in an amount of from about 1% to about 10% by weight of the conventional proppant.

8. The method of claim 1, wherein the conventional proppant is present in the second proppant composition in an amount of from about 0.2 lbm/gal of the second base fluid to about 4 lbm/gal of the second base fluid.

9. The method of claim 1,
   wherein the first and second proppant compositions are substantially free of consolidating agents;
   wherein the low-density and conventional micro-proppants are not agglomerated and do not form proppant aggregates; and
   wherein the low-density and conventional proppants are not agglomerated and do not form proppant aggregates.

10. A method of treating a wellbore, comprising:
    isolating a first interval in a wellbore;
    introducing a first treatment fluid into the first interval at a first pressure sufficient to create or enhance at least one fracture in the first interval the first treatment fluid being substantially free from proppant agglomerations; wherein introducing the first treatment fluid comprises at least a first micro-proppant stage, the first micro-proppant stage comprising introducing:
  a first base fluid;
  a low-density micro-proppant having proppant particles with particulate sizes of from about 0.5 microns to about 100 microns and a specific gravity of from about 0.8 to about 1.3 grams per cubic centimeter; and
  a conventional micro-proppant having proppant particles approximately the same particulate size as the proppant particles of the low-density micro-proppant and a specific gravity of from about 2.1 to about 4.5 grams per cubic centimeter;
after introducing the first treatment fluid, introducing a second treatment fluid into the first interval, the second treatment fluid being substantially free from proppant agglomerations; wherein introducing the second treatment fluid comprises at least a first proppant stage, the first proppant stage comprising introducing:
  a second base fluid;
  a conventional proppant having a specific gravity of from about 2.1 to about 4.5 grams per cubic centimeter and having proppant particles with particulate sizes of greater than 100 microns; and
  a low-density proppant having proppant particles approximately the same particulate size as the proppant particles of the conventional proppant and a specific gravity less than the specific gravity of the conventional proppant.

11. The method of claim 10, wherein introducing the first treatment fluid further comprises a second micro-proppant stage and introducing the second treatment fluid comprises a second proppant stage.

12. The method of claim 10, wherein the conventional proppant is frac sand.

13. The method of claim 10, wherein the low-density micro-proppant is present in the first micro-proppant stage in an amount of from about 1% to about 10% by weight of the conventional micro-proppant; or
  the conventional micro-proppant is present in the first micro-proppant stage in an amount of from about 0.01 pound mass per gallon (lbm/gal) of the first base fluid to about 0.2 lbm/gal of the first base fluid.

14. The method of claim 10, wherein the low-density proppant is present in the first proppant stage in an amount of from about 1% to about 10% by weight of the conventional proppant; or
  the conventional proppant is present in the first proppant stage in an amount of from about 0.2 lbm/gal of the second base fluid to about 4 lbm/gal of the second base fluid.

15. A method of treating a wellbore, comprising:
isolating a first interval extending from a wellbore in a subterranean formation, the first interval comprising at least one fracture;
introducing a first treatment fluid into the first interval, the first treatment fluid comprising a first base fluid and a conventional micro-proppant comprising particles with particulate sizes of from about 0.5 microns to about 100 microns and having a specific gravity of from about 2.1 to about 4.5 grams per cubic centimeter;
introducing a first low-density micro-proppant into the first treatment fluid, the first low-density micro-proppant comprising particles with particulate sizes of from about 0.5 microns to about 100 microns and having a specific gravity of from about 0.8 to about 1.3 grams per cubic centimeter;
after introducing the first treatment fluid, introducing a second treatment fluid into the first interval, the second treatment fluid comprising a second base fluid and a conventional proppant comprising proppant particles with particulate sizes greater than about 100 microns and having a specific gravity of from about 2.1 to about 4.5 grams per cubic centimeter; and
introducing a first low-density proppant into the second treatment fluid, the first low-density proppant comprising proppant particles with particulate sizes greater than about 100 microns and having a specific gravity of from about 0.8 to about 1.3 grams per cubic centimeter;
wherein the first and second treatment fluids are substantially free of consolidating agents.

16. The method of claim 15, wherein introducing the first low-density micro-proppant into the first treatment fluid comprises pulsing the first low-density micro-proppant into a stream of the first treatment fluid.

17. The method of claim 15, wherein introducing the first low-density proppant into the second treatment fluid comprises pulsing the first low-density proppant into a stream of the second treatment fluid.

18. The method of claim 15, wherein the first low-density micro-proppant is added to the first interval in an amount of from about 4% to about 10% by weight of the conventional micro-proppant; or
  the conventional micro-proppant is added to the first treatment fluid in an amount of from about 0.01 pound mass per gallon (lbm/gal) of the first base fluid to about 0.2 lbm/gal of the first base fluid.

19. The method of claim 15, wherein the first low-density proppant is added to the first interval in an amount of from about 1% to about 10% by weight of the conventional proppant; or
  the conventional proppant is added to the first treatment fluid in an amount of from about 0.2 lbm/gal of the second base fluid to about 4 lbm/gal of the second base fluid.

20. The method of claim 15, further comprising:
after introducing the second treatment fluid, introducing a third treatment fluid into the first interval, the third treatment fluid comprising a third base fluid and a second low-density micro-proppant comprising particles with particulate sizes of from about 0.5 microns to about 100 microns and having a specific gravity of from about 0.8 to about 1.3 grams per cubic centimeter; and
after introducing the third treatment fluid, introducing a fourth treatment fluid into the first interval, the fourth treatment fluid comprising a fourth base fluid and a second low-density proppant comprising proppant particles with particulate sizes greater than about 100 microns and having a specific gravity of from about 0.8 to about 1.3 grams per cubic centimeter.

* * * * *